US009673917B2

(12) United States Patent
Conroy et al.

(10) Patent No.: US 9,673,917 B2
(45) Date of Patent: Jun. 6, 2017

(54) CALIBRATION USING NOISE POWER

(75) Inventors: Cormac S. Conroy, Campbell, CA (US); Leonid Sheynblat, Hillsborough, CA (US); Anup Savla, San Mateo, CA (US); Roger Brockenbrough, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 12/323,195

(22) Filed: Nov. 25, 2008

(65) Prior Publication Data
US 2009/0298422 A1  Dec. 3, 2009

Related U.S. Application Data

(60) Provisional application No. 61/057,746, filed on May 30, 2008.

(51) Int. Cl.
*H04B 17/21* (2015.01)
(52) U.S. Cl.
CPC .................. *H04B 17/21* (2015.01)
(58) Field of Classification Search
CPC ....................................... H04B 17/21
USPC ...... 455/67.13, 184.1, 226.1–226.4; 375/147
See application file for complete search history.

(56) References Cited

U.S. PATENT DOCUMENTS 2,685,031 A * 7/1954 Johnson ........................ 331/78
5,732,341 A * 3/1998 Wheatley, III ............. 455/234.1
2006/0040617 A1 * 2/2006 Haub et al. ................. 455/67.13
2006/0160510 A1 * 7/2006 Seppinen et al. ........... 455/232.1
2006/0264192 A1   11/2006 Kuo et al.
2006/0291549 A1   12/2006 Seppinen et al.
2007/0243841 A1 * 10/2007 Husted et al. .............. 455/226.3

FOREIGN PATENT DOCUMENTS

| CN | 1193430 A    | 9/1998  |
|----|--------------|---------|
| CN | 1881807 A    | 12/2006 |
| CN | 101189804 A  | 5/2008  |
| EP | 1724953 A2   | 11/2006 |
| JP | H104390 A    | 1/1998  |
| JP | 2001230686 A | 8/2001  |
| JP | 2001285216 A | 10/2001 |
| JP | 3500090 B2   | 2/2004  |
| JP | 2004505571 A | 2/2004  |
| JP | 2004312077 A | 11/2004 |
| JP | 2005237038 A | 9/2005  |
| JP | 2007013937 A | 1/2007  |

(Continued)

OTHER PUBLICATIONS

International Search Report and Written Opinion—PCT/US2009/045138—ISAEPO—Oct. 27, 2009.
Taiwan Search Report—TW098117864—TIPO—Jul. 26, 2012.

*Primary Examiner* — Lincoln Donovan
*Assistant Examiner* — Colleen O Toole
(74) *Attorney, Agent, or Firm* — Thomas Jolly

(57) ABSTRACT

A method calibrates a spread spectrum receiver having a received signal strength below a noise floor. The method includes estimating an input noise power, and measuring a noise power output from the receiver. The method also includes comparing the estimated input noise power with the measured output noise power to determine at least one calibration value. The method further includes calibrating the receiver based upon the at least one calibration value.

41 Claims, 7 Drawing Sheets

(56) References Cited

FOREIGN PATENT DOCUMENTS

| JP | 2008546249 | A  | 12/2008 |
|----|------------|----|---------|
| WO | 8908853    | A1 | 9/1989  |
| WO | 0211470    | A1 | 2/2002  |
| WO | WO03079573 | A1 | 9/2003  |
| WO | 2006124951 | A2 | 11/2006 |
| WO | 2007000632 | A2 | 1/2007  |

\* cited by examiner

CALIBRATION USING NOISE POWER

CROSS REFERENCE TO RELATED APPLICATION

The present application claims the benefit of U.S. provisional patent application No. 61/057,746, filed on May 30, 2008, in the names of C. CONROY et al.

TECHNICAL FIELD

The present disclosure generally relates to wireless systems. More specifically, the present disclosure relates to calibrating RF receivers.

BACKGROUND

Modern wireless receiver design relies heavily on calibration to achieve desired performance. Calibration is often implemented to adjust operating conditions based on circuit performance. It reduces the need for over design to meet performance across statistical variation in circuits. For example, gain calibration can be employed to keep receiver gain relatively constant across operating conditions.

Modern wireless receivers are typically implemented in integrated circuits. Including dedicated calibration structures in such integrated circuits incurs costs in terms of die area, design resources and test inputs. In particular, the test inputs for use in a factory calibration setting can prove expensive. Therefore, it is desirable to employ power-on calibration or periodic self-calibration techniques as much as possible.

In receiver RF front ends, cascaded gain is a strong function of device transconductance, and varies with performance corners and temperature. Similarly, for receivers with very narrowband response, band response is dependent on capacitor and inductor sizes, and can vary with corners as well as model inaccuracy. Therefore, accurate calibration is required in such receivers to ensure the response is centered in the desired frequency band and gain, especially when the receivers have a very narrow bandwidth response.

Among existing techniques for gain calibration and band tuning, a frequency-sweeping input tone with a known power level can be applied to the receiver input while monitoring the output of the receiver. This method is very straightforward and provides gain and band tuning information in the same test. However, providing a frequency-sweeping input tone can be very expensive during factory calibration.

A modification of the above method can use an on-chip local oscillator signal as a test input. However, routing the local oscillator test signal to a low noise amplifier input may be a design concern. Moreover, calibration becomes less robust due to potential for change in local oscillator power.

Another approach for band tuning is to use similar inductors for the low noise amplifier and voltage control oscillator (VCO) and derive band tuning information from the VCO tuning code. This method constrains the low noise amplifier inductor size and may not provide adequate accuracy.

It would be desirable to be able to accurately calibrate front end filters while overcoming the shortcomings of traditional approaches.

SUMMARY

Improved methods and apparatus for frequency and gain calibration are provided. In one aspect, the apparatus accurately predicts noise power at an input of an RF receiver and after measuring noise power at an output of the receiver, predicts center frequency and gain of the receiver. The predicted gain enables calibration of the receiver, both frequency calibration and gain calibration. The calibration can be performed dynamically, without any extra hardware, during normal operation of the RF receiver, as long as the received signal has power less than a noise floor.

In another aspect, a method calibrates a receiver having a received signal strength below a noise floor. The method includes measuring a noise power output from the receiver across a range of frequencies; analyzing the measured output noise power to determine gain in a frequency band; and calibrating relative gain of the receiver based upon the analysis.

In yet another aspect, a mobile device includes an RF antenna system that receives a signal having a maximum signal strength below a noise floor. The device also includes an RF receiver system that processes the received signal; and a calibration system. The calibration system calibrates the RF receiver system based upon an analysis of measured output noise power of the RF receiver system In still a further aspect, a satellite positioning system receiver includes a low noise amplifier that processes a signal received from an antenna. The signal has a maximum signal strength below a noise floor. The receiver also has a calibration system that calibrates the low noise amplifier based upon an analysis of a measured output of the receiver and an estimated input of the low noise amplifier.

In another aspect, a satellite positioning system receiver includes means for comparing a measured output of a spread spectrum receiver and an estimated input of the spread spectrum receiver. The receiver also includes means for calibrating the spread spectrum receiver based upon the comparing. The spread spectrum receiver receives a signal having a maximum strength below a minimum received noise power.

In yet another aspect, a method calibrates a spread spectrum receiver having a received signal strength below a noise floor. The method includes estimating an input noise power; measuring a noise power output from the receiver, and comparing the estimated input noise power with the measured output noise power to determine at least one calibration value. The method also includes calibrating the receiver based upon the at least one calibration value.

In still another aspect a computer readable medium stores a computer program. The program includes program code to repeatedly measure output noise power to determine a relative maximum gain at a specified frequency. The medium also includes program code to repeatedly calibrate an RF receiver based upon the determined relative maximum gain.

The foregoing has outlined rather broadly the features and technical advantages of the present invention in order that the detailed description that follows may be better understood. Additional features and advantages will be described hereinafter and form the subject of the claims of the invention. It should be appreciated by those skilled in the art that the conception and specific aspects disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings.

DETAILED DESCRIPTION

Figure 1:
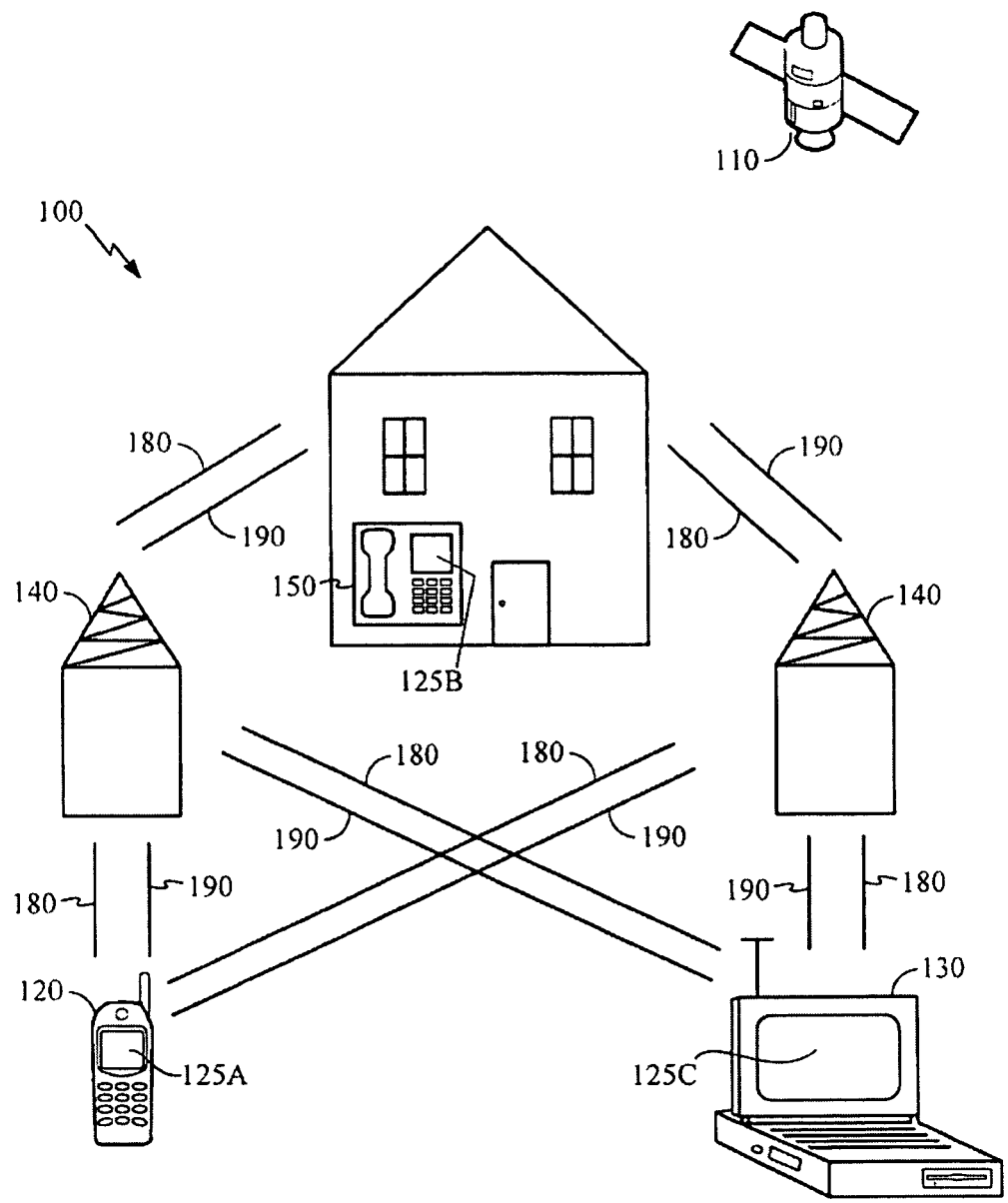
FIG. 1 is a block diagram showing an exemplary communication system in which an aspect of the disclosure may be advantageously employed.

FIG. 1 shows an exemplary communication system 100 in which an aspect of the disclosure may be advantageously employed. For purposes of illustration, FIG. 1 shows a satellite 110 as part of a satellite positioning system (SPS), such as (GPS). FIG. 1 also shows three mobile stations (which can be GPS receivers) 120, 130, and 150 and two base stations 140. It will be recognized that typical wireless communication systems may have many more mobile stations and base stations. Mobile stations 120, 130, and 150 include improved calibration systems 125A, 125B and 125C, respectively, which are aspects of the disclosure as discussed further below. FIG. 1 shows forward link signals 180 from the base stations 140 and the mobile stations 120, 130, and 150 and reverse link signals 190 from the mobile stations 120, 130, and 150 to base stations 140. Communications links between the satellite 110 and the mobile stations (for example, when functioning as GPS receivers) 120, 130, 150 are not illustrated.

In FIG. 1, mobile station 120 is shown as a mobile telephone, mobile station 130 is shown as a portable computer, and mobile station 150 is shown as a fixed location remote unit in a wireless local loop system. For example, the mobile stations may be GPS receivers, cell phones, handheld personal communication systems (PCS) units, portable data units such as personal data assistants, or fixed location data units such as meter reading equipment. Although FIG. 1 illustrates mobile stations according to the teachings of the disclosure, the invention is not limited to these exemplary illustrated units. The disclosure may be suitably employed in any device that includes an RF calibration system.

In an aspect of the disclosure, calibration of an RF receiver is based upon analysis of noise power. Monitoring noise power at the output of the receiver enables an estimate of gain in a frequency band. When the received signal strength is well below the noise floor, calibration can occur at power on, as well as during receiver operation, for example in a background mode.

Figure 2:
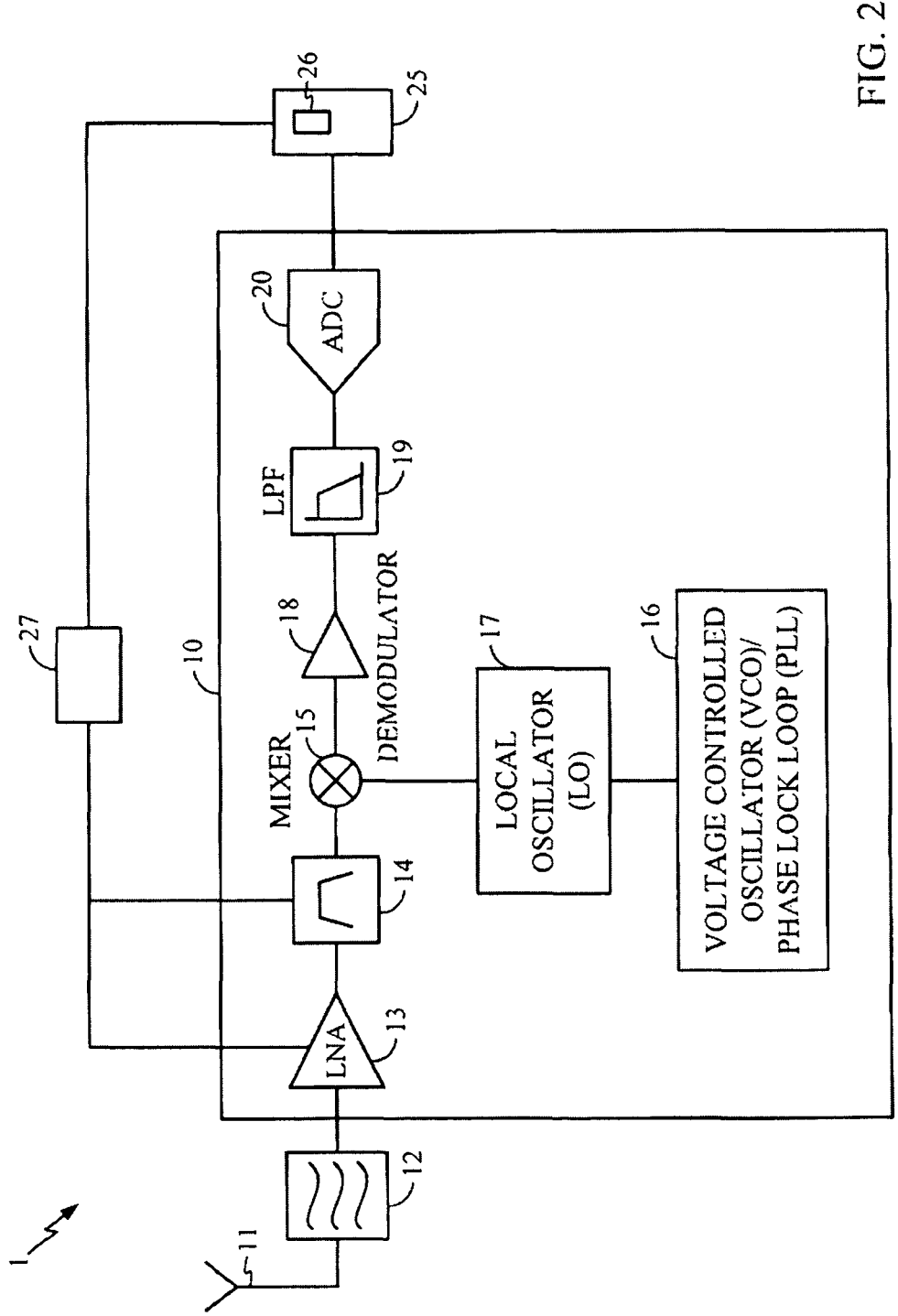
FIG. 2 is a block diagram of an RF receiver.

Referring now to FIG. 2, an exemplary RF receiver in which the present disclosure can be employed is described. Although spread spectrum and more specifically a satellite positioning system (SPS) is described to illustrate the teachings of the present disclosure, the present invention contemplates any RF system in which the maximum received signal strength is below the noise floor. RF systems with signals below the noise floor include ultra wide band (UWB) and CDMA 1xRTT.

The RF receiver 1 includes RF front end processing circuitry, in one aspect implemented on a single chip 10. The RF front end processing chip 10 processes a signal received from an antenna 11. In this example the received signal will be a SPS signal, specifically a GPS signal.

Prior to the signal received from the antenna 11 arriving at the RF front end processing chip 10, an off chip filter 12 attenuates out-of-band signals so that only in-band signals are forwarded to the RF front end processing chip 10. The RF front end processing chip 10 initially receives the signal at a low noise amplifier 13, which after processing, outputs a signal to a filter 14. The filter 14 outputs a filtered signal to a mixer 15 for down conversion.

The down conversion process, generally speaking, mixes two signals. The mixer 15 receives the filtered RF signal from the filter 14, and also an oscillator frequency. The oscillator frequency is controlled by a voltage control oscillator (VCO) 16 that drives a local oscillator (LO) 17, both present on the chip 10. A phase lock loop (not shown) controls the voltage control oscillator 16.

A demodulator 18, such as a transimpedance amplifier, receives the down converted signal. Although a transimpedance amplifier is being discussed, any demodulator or post mixer could be substituted, such as a filter or programmable gain amplifier. In one aspect, the demodulator 18 is in digital form after an analog to digital conversion. In another aspect, the demodulator 18 is an active mixer with a voltage output From the demodulator 18, the signal is transmitted to a low pass filter 19 and then an analog to digital converter 20. In one aspect of the disclosure, the digital signal from the analog to digital converter 20 is received at another chip 25.

The other chip 25 will be generally referred to as a digital base band processor or digital base band engine. The digital base band engine 25 includes a built-in integrator 26. Integrated noise power output values can thus be directly received from the digital base band engine 25, without requiring extra processing within the RF front end processing chip 10. In other words, because SPS systems generally have correllators and integrators in the digital base band engine 25 as a natural function of that design, the output of those integrators 26 is always readily available all the time and can be used for calibration.

A controller 27 can be provided to control the calibration. The controller 27 receives the data output from the integrator 26 of the digital base band engine 25, and compares the received values with desired frequency and gain values. If a measured value differs from the desired value, the controller 27 calibrates the low noise amplifier 13 and the filter 14 to obtain the desired gain and frequency, respectively.

Figure 3A:
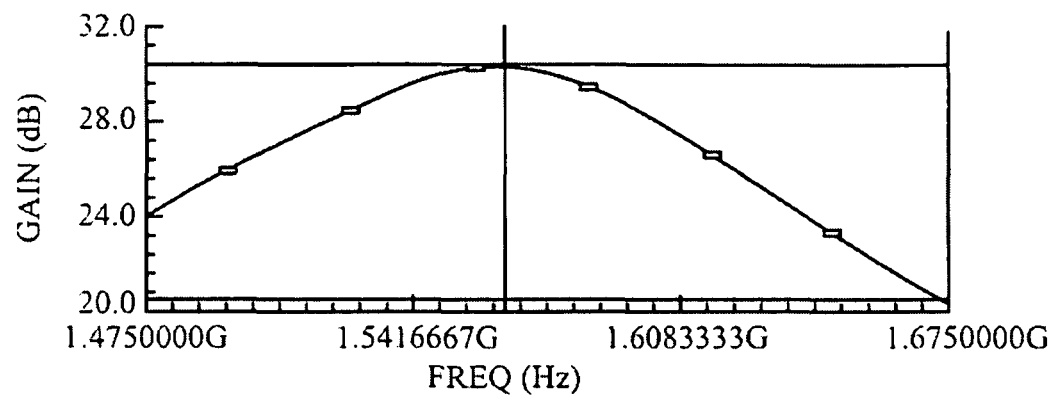
FIG. 3A is a graph showing internal gain relative to frequency.
Figure 3B:
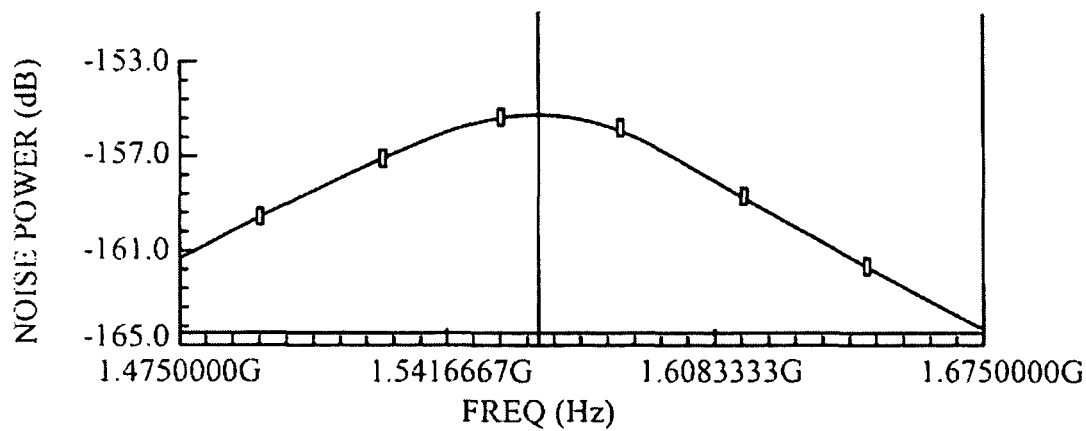
FIG. 3B is a graph showing internal noise power relative to frequency.

Referring to FIG. 3A, gain at the output of the low noise amplifier 13, relative to frequency is shown. FIG. 3A, demonstrates the selectivity of the low noise amplifier 13. FIG. 3B shows noise power output from the low noise amplifier 13 plotted relative to frequency. As seen by comparing FIGS. 3A and 3B, gain can be accurately estimated by looking at noise power at the output of the low noise amplifier 13 because the plots are quite similar. Not only is the noise power Output from the low noise amplifier 13 a very good indicator of the amount of gain, but the noise power also indicates the frequency at which the gain is at its maximum.

Figure 4:
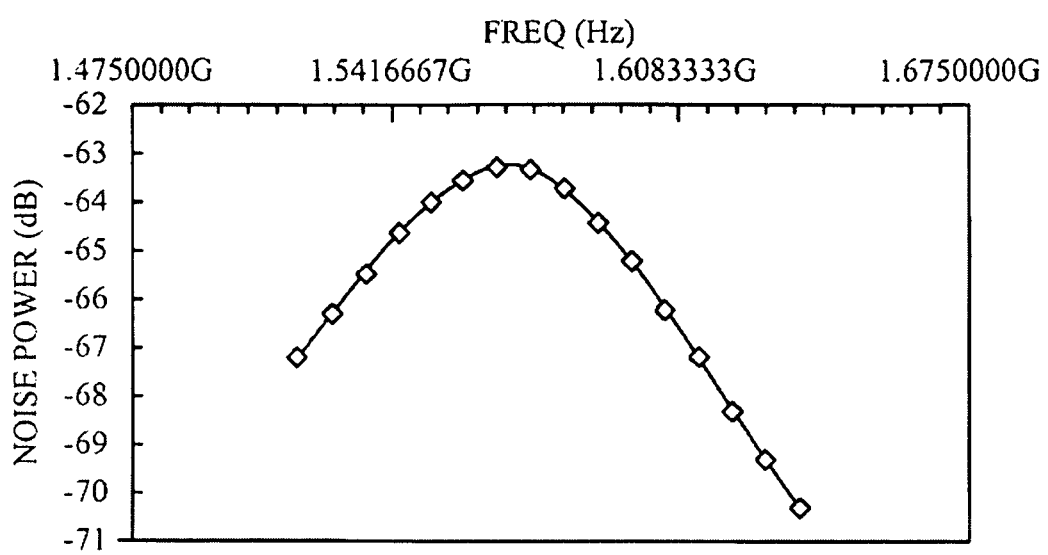
FIG. 4 is a graph showing external noise power relative to frequency.

Referring to FIG. 4, integrated noise power at the output of the entire RF front end processing chip 10 (as opposed to the output of the low noise amplifier 13) is plotted versus frequency. The plot follows the profile seen in FIGS. 3A and 3B. The output plotted in FIG. 4 does not account for any other filtering within the receiver except for that of the low noise amplifier 13. Therefore, output noise power from the RF front end processing chip 10 is a good indicator of the frequency for maximum gain at the low noise amplifier 13. Also observable is the rejection or the difference in gain between in-band (which is a frequency around 1575 MHz for GPS) and out of band (which is a frequency of 1650 MHz or higher for GPS.) Therefore, the information from the output of the receiver can be used to calibrate components within the receiver 1.

FIG. 3B shows output directly from the low noise amplifier 13, whereas FIG. 4 shows output from the receiver 1, with virtually the same shape as the output of the low noise amplifier 13. A reason the signal measured is at the receiver output (instead of directly from the low noise amplifier 13) is because there is generally no access to the signal immediately after the low noise amplifier 13. However, because the shape is very similar, the signal can be sampled at a different point, i.e., the receiver output, and used to go back and adjust the filter 14 and low noise amplifier 13.

Calibration can occur based upon measurement of the noise power at the output because: 1) the input power of random thermal noise (at the low noise amplifier) can be accurately estimated, and 2) the input power has a relatively flat frequency, i.e., the power does not change significantly with frequency. As long as either the input power can be accurately estimated or the input power has a relatively flat frequency, input power (even of persistent sources other than noise) can be used for calibration. Moreover, when the signal strength is below the noise floor (such as with GPS), any signal that is present will not significantly affect the input noise power. Thus, the power of any input signal can be unknown and calibration can still occur using the input noise power.

In one embodiment, the input noise power is estimated in order to use noise power for calibration. According to an aspect of the present disclosure, the power of the input noise is estimated according to the equation:

$$\text{Noise Power} = 4 \times K \times T \times R \quad (1)$$

where K is Boltzmann's constant;
T is temperature in Kelvin; and
R is the radiation resistance of the antenna.

In a mobile unit having a GPS receiver, the radiation resistance of the antenna 11 is typically 50 ohms, and a nominal operating temperature, is assumed to be around 245K-265K. In one embodiment, the actual temperature is obtained from temperature circuitry on the mobile unit. In another embodiment, input noise power spectral density is estimated based upon the temperature measured by the circuitry, using equation 1. In this embodiment, as temperature varies, the absolute gain can be continuously calibrated during normal operation of the GPS receiver.

When noise power is multiplied by the bandwidth of the given signal, the in-band noise power has been calculated. Because noise is random, accuracy of the noise power estimate is achieved after enough integration over frequency as well as averaging over multiple time intervals.

The input noise power (which is estimated based upon equation (1)), transmits through the receiver, experiencing a certain amount of gain and filtering. At the output, the noise power is measured to determine the amount of actual gain of the receiver. More specifically, by comparing the estimated input noise power and measured output noise power, the amount of gain can be inferred. For example, measuring the power 4 K×T×R×Bandwidth×1,000 at the output, suggests that the in-band noise power at the output is 1,000 times higher than the in-band noise power at the input. Thus, gain through this receiver is inferred to be 1,000 or 30 db.

If the desired gain is 25 db, the low noise amplifier 13 will be adjusted down 5 db. The frequency corresponding to the peak of measured noise power is observed. The observed frequency is then compared with a desired frequency and the center frequency of the filter 14 is adjusted to match the desired frequency.

Referring back to FIG. 3B showing low noise amplifier gain, inaccuracies in the receiver will shift this response to the left or the right on the frequency scale. The calibration using the noise power brings it back to the center, keeping the performance of the radio at or near its optimum.

The calibration changes not only the filter 14, but also the low noise amplifier 13. In one aspect, the low noise amplifier 13 responds to the calibration results by changing a capacitor in its load tank so that the band pass shape becomes centered again.

If the receiver 1 operates with received signal power well below the noise power, signal power cannot add significantly to the total power of the system. Consequently, calibration can occur during operation of a completely built device, e.g., a phone, without having to be in a factory environment. The calibration periodically could be used as a receiver characteristics monitor in a self-diagnostics mode. The output of that diagnostic could be used to readjust the gain and/or frequency slightly. In another aspect, the calibration occurs on power up. In other aspects, the calibration occurs at other tiles.

Figure 5:
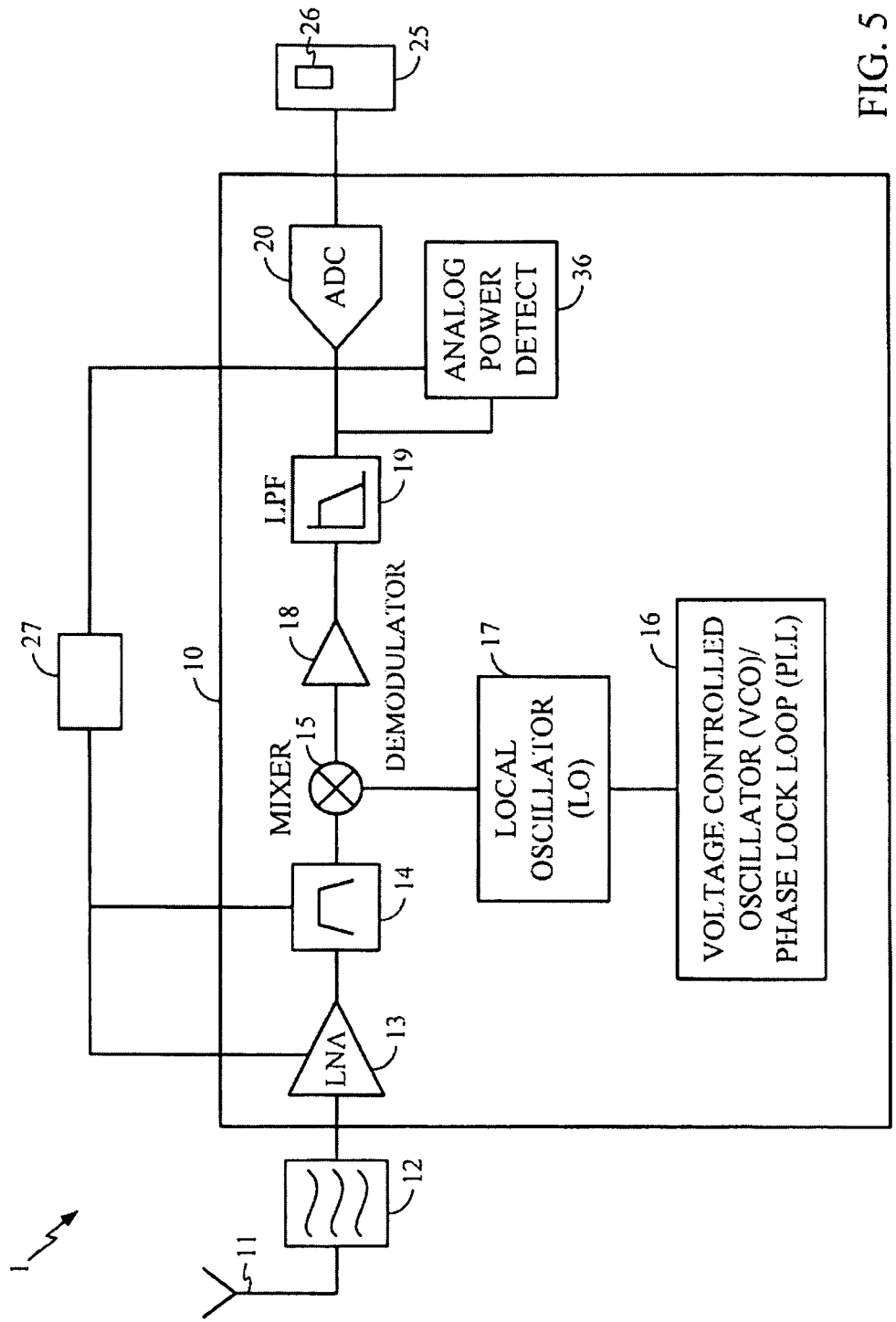
FIG. 5 is a block diagram of an alternate RF receiver.

Referring to FIG. 5, another aspect of the disclosure will now be discussed. In this aspect, an on-chip power detector 30 provides an output used instead of the integrated output for calibration. The on-chip power detector 30 receives a signal directly from the low pass filter 19, and eliminates the need for the digital base band engine 25 for calibration purposes.

Although the on-chip power detector 30 is shown as receiving the signal from the low pass filter 19, it is possible for the on-chip power detector 30 to receive a signal directly from the demodulator 18. However, it may be preferable to receive the signal after the low pass filter 19 because integrating the noise power should occur over a defined bandwidth. Thus, when the input bandwidth is known, the resulting noise power per Hertz is known. In an analog domain when measuring power in any signal, a width of frequency components present in the signal cannot be directly inferred. A known filter, such as the low pass filter 19, constrains the bandwidth to a known range, permitting power to be analyzed while assuming the shape in a certain fashion within the known bandwidth. If bandwidth is limited in a controlled fashion, then in addition to being able to find the peak in the noise power as a function of tuning, an accurate measure of the absolute noise power is determined so an accurate measure of the absolute gain of the receiver can be calculated. If only frequency tuning is occurring, however, only a local maximum value is needed. In another aspect, the on-chip power detector receives a digital signal from the analog to digital converter 20.

In the case of the on-chip power detector 30, the digital base band 25 and its correlators and integrators are not needed. Rather, the analog power detector 30 measures total signal power in a defined bandwidth, and its output can be a voltage or a current signal.

Although the preceding description assumed that noise was being received by the antenna 11, in other words the receiver is in use, the present disclosure is also applicable in cases where the antenna is not receiving a signal, such as during factory calibration. Thus, the present disclosure can replace large, expensive signal generators used for calibration in a factory setting. In this aspect, a known input source is created. For example, the input to the low noise amplifier 13 can be terminated by either placing an on-chip resistor between the filter 12 and the low noise amplifier 13 or placing an off-chip termination (e.g., resistor) before the filter 12. In the latter case, a connector could switch between the off-chip resistor and the antenna 11. By switching between the received signal, i.e., antenna 11 and the resistor, calibration could occur during normal operation (with the antenna) accounting for environmental changes such as temperature, or could occur in a factory mode (with the resistor selected) replacing conventional signal generators, and saving test costs.

In one aspect, the resistor has a value corresponding to the resistance of the antenna, e.g., 50 ohms in a GPS system, but in any event the resistance should be a known value so that the power spectral density can be estimated. In other words, the known resistor value enables calculation of the power spectral density, which in turn enables calibration according to the paradigm discussed above.

As mentioned previously, the output from the receiver is integrated within the digital base band engine 25. The integration bandwidth can be selected based upon various factors.

Although the receiver can have an input spectrum that is relatively flat in its power over frequency, due to the gain of the receiver, (for example from radio architecture or design-related non-idealities) the output while also being relatively flat, might have spurs or spikes in power. A wide enough integration bandwidth samples energy information from a wide frequency range, reducing the relative contribution of spurs so that accuracy is not affected. That is an advantage of having as wide a bandwidth as possible for the integration.

It may be inappropriate to select a wide frequency range for integration when noise shaping results in a non-white noise power spectrum. For example, a class of analog to digital converters, referred to as sigma-delta analog to digital converters do not output flat noise across a wide range of frequencies. Thus, the frequency region where the noise power is mostly flat should be sampled, resulting in selection of a narrow enough bandwidth to prevent raised noise power from affecting the results.

In summary, in the presence of spurs a wider bandwidth is advantageous, and in the presence of non-white noise power spectrum a narrow bandwidth is advantageous.

In one aspect, the present disclosure addresses problems from self generated interference. To the extent that spurs result from the interference the integration bandwidth selection trade off applies. To the extent the spurs raise the noise floor, the increase resulting from the interfering signal must be evaluated. That is, when applying the spreading code in a spread spectrum system, the spur will spread out, increasing the noise floor. As mentioned above, a wide enough integration bandwidth is used so that the spur adds minimally to the noise power and the interferer will not affect the calibration. In a GPS example, gain is typically 80 db and the accuracy required is around 1 dB. Thus, the entire noise power would have to be increased by 1 dB to appreciably affect the gain reading and render it inaccurate.

Because severe in-band continuous interference could affect calibration results, in one aspect of the present disclosure, self generated in-band interference is detected. Detection is possible because the device is aware of when it is transmitting. When a detected transmission occurs, calibration is postponed until the detected transmission is finished. In another aspect, when the detected transmission occurs the digital base band engine 25 receives the indication and any calibration is ignored as invalid because of the detected interference.

Figure 6:
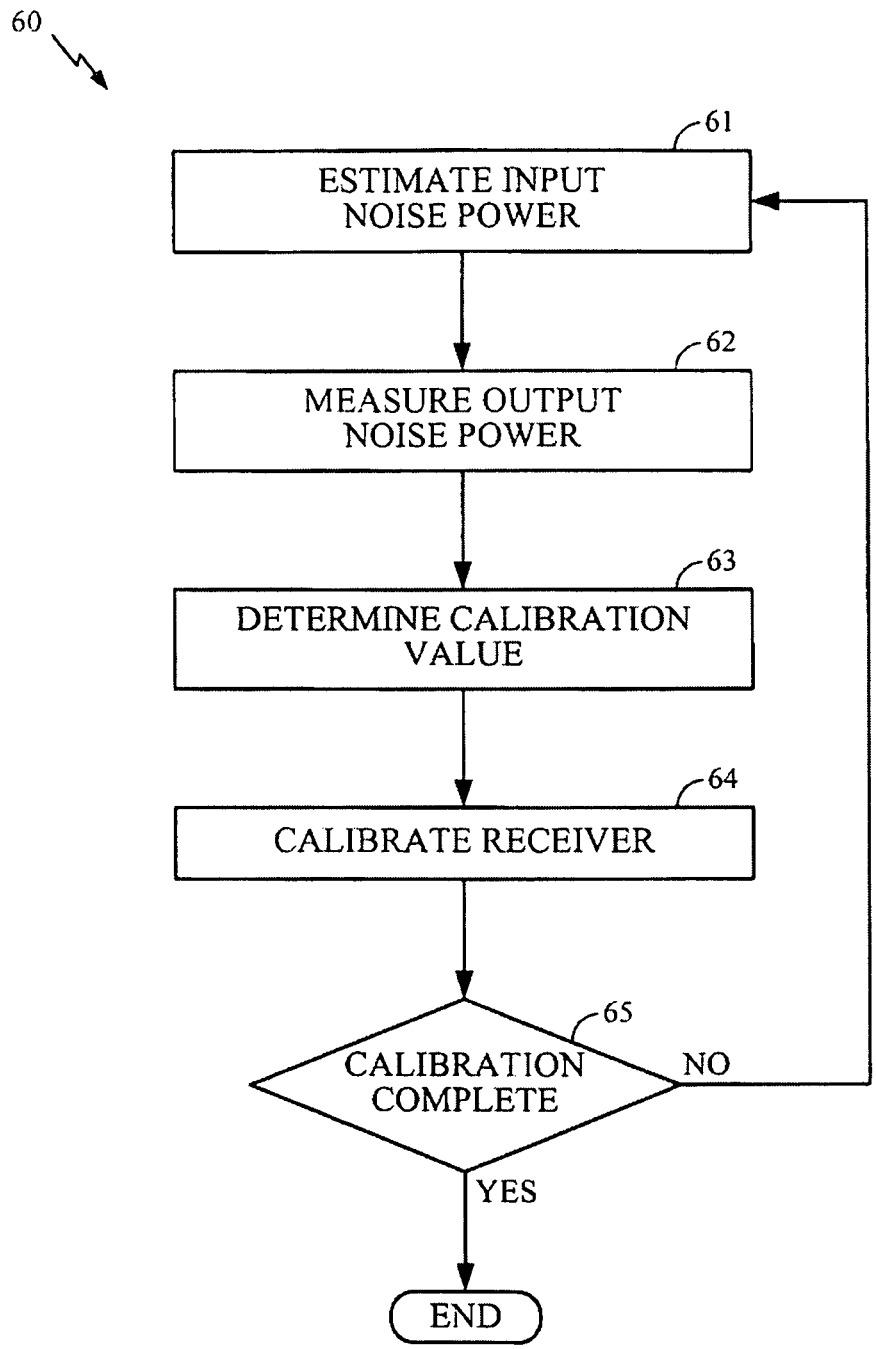
FIG. 6 is a flow diagram showing an exemplary calibration process.

Referring to FIG. 6, a calibration process 60 will now be discussed. A search algorithm (executed in the controller 27) controls a loop in the sense that feedback from the output of the power estimator is used to calibrate the filter 14 to center and also to calibrate the gain of the low noise amplifier 13.

Initially, a process 61 input noise power is estimated based on equation 1. At process 62, noise power output from the receiver is measured. Based upon the measured output noise power, the gain through the receiver as well as the center frequency are determined. By looking at desired values, a calibration value can be calculated in process 63. In other words, the difference between the measured value and the desired value is observed. A corresponding amount of adjustment to the filter and/or low noise amplifier is calculated. At process 64, the receiver is actually calibrated. In one aspect, the frequency is calibrated before the gain. At process 65, it is determined whether calibration is complete or the loop needs to continue. If the calibration is complete, the process repeats from process 61. Otherwise, the calibration is concluded.

The present disclosure can also accommodate automatic gain control. If while the calibration is ongoing, automatic gain control changes the gain of the receiver to maintain a constant amount of output power, then repeated estimates of output power are occurring at a time when the gain of the receiver is changing, adding inaccuracy to the measurements. Therefore, both the calibration and automatic gain control should not work at the same time. When calibration is desired, the automatic gain control is temporarily deactivated for long enough to complete a calibration.

In another aspect of the present disclosure, a feature attenuates a strong interfering signal. In one example, a W-CDMA band transmission interferes with a GPS L1 or 1.575 megahertz signal of interest. Because of the inaccuracy of calibrations, a center frequency range, rather than a specific value is provided as a desired "value". Because a large amount of variation is accounted for with the final calibration results, the calibration can shift the results away from the interfering signal. That is, the calibration shifts the center frequency away from the interfering signal. Because of the sharpness of the response itself, shifting back and forth in the frequency axis will have a large impact on the attenuation.

Figure 7A:
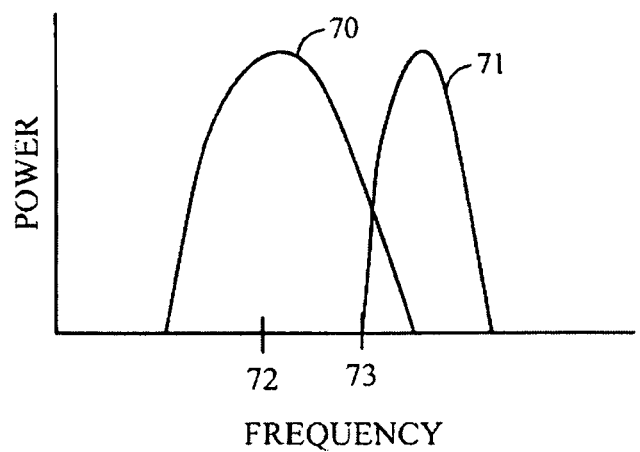
FIG. 7 is a graph showing two interfering signals with power plotted relative to frequency.
Figure 7B:
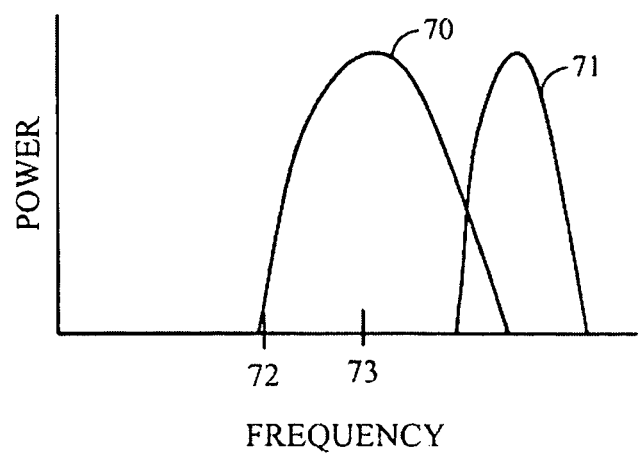

Referring to FIGS. 7A and 7B, a signal of interest 70 and an interfering signal 71 are shown. The signal of interest should have its peak power at a frequency somewhere between two points 72, 73. In other words, die peak can be tuned in the frequency axis between the two values 72, 73 and still be in-band to the calibration resolution. To attenuate the blocking signal, the center of the signal of interest 70 could be moved as far as possible from the interfering signal 71 while remaining within the permitted calibration resolution, i.e, the peak between points 72 and 73.

So for example, if a ±10 MHz variance in the final centered band results, then in the worst case, this band would be high by 10 MHz, with a peak of the signal of interest 70 at point 73. Then, this interferer 71 would only be minimally offset relative to the center of the band, as seen in FIG. 7B. According to this aspect of the disclosure, the peak can be offset by up to 20 megahertz away from the interferer 71, i.e. to point 72 as seen in FIG. 7A, and consequently good attenuation results.

The method and apparatus described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

Calibration using position determination techniques described herein may be used in various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. Similarly, multi-frequency receivers and diversity receivers are contemplated.

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile device which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at tie device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Also, mobile device includes receive only (i.e., one way) devices, such as GPS receivers. The mobile station could also include any type of multi-frequency receiver. Any operable combination of the above are also considered a "mobile station."

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of a mobile station, and executed by a processor, for example the microprocessor of a modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same unction or achieve substantially the same result as the corresponding aspects described herein may be utilized according to the present invention. Accordingly, the appended claims are intended to include within their scope such processes, machines, manufacture, compositions of matter, means, methods, or steps.

What is claimed is:

1. A method for calibrating a receiver, the method comprising:
   receiving, at the receiver, an input signal comprising an input noise and a received signal, the input signal being received wirelessly via a radio frequency (RF) antenna configured for use in radio frequency communications;
   generating, at the receiver, an output signal from the input signal;
   estimating an input noise power to the receiver across a range of frequencies, the input noise power comprising a power of the input noise in the input signal;
   measuring an output noise power across the range of frequencies based on the output signal generated at the receiver from the input signal received via the RF antenna, the output noise power comprising a power of an output noise in the output signal;
   determining a gain in a specified frequency band based on the estimated input noise power and the measured output noise power, the specified frequency band being less than an operating receive frequency band of the receiver; and
   calibrating a relative gain of the receiver based upon the determined gain in the specified frequency band,
   wherein the input noise is not internally generated in the receiver, and
   wherein the received signal is a signal whose strength is below a noise floor.

2. The method of claim 1, in which the calibrating occurs upon powering up the receiver.

3. The method of claim 1, in which the measuring further comprises integrating the measured output noise power of a time period.

4. A non-transitory computer readable medium storing a computer program executable by a processor of a wireless device, the computer program comprising:
   program code that causes the processor to estimate an input noise power and measure an output noise power to determine a relative maximum gain at a specified frequency, the specified frequency being less than an operating receive frequency band of a radio frequency (RF) receiver of the wireless device, the output noise power being measured based on an output signal generated at the RF receiver from an input signal comprising an input noise and a received signal, the input signal being received wirelessly via a RF antenna configured for use in radio frequency communications; and
   program code that causes the processor to calibrate the RF receiver based upon the determined relative maximum gain at the specified frequency,
   wherein the input noise power comprises a power of the input noise in the input signal,
   wherein the output noise power comprises a power of an output noise in the output signal, and
   wherein the input noise is not internally generated in the wireless device, and
   wherein the received signal is a signal whose strength is below a noise floor.

5. The non-transitory computer readable medium of claim 4, in which the program code causes the processor to calibrate a gain of the RF receiver.

6. The non-transitory computer readable medium of claim 4, in which the program code causes the processor to calibrate a frequency response of the RF receiver.

7. The non-transitory computer readable medium of claim 4, in which the program code causes the processor to calibrate the RF receiver upon a power-up of the RF receiver.

8. The non-transitory computer readable medium of claim 4, further comprising program code that causes the processor to adjust a calibration value to attenuate an interfering signal.

9. A mobile device, comprising:
   a receiver system comprising a radio frequency (RF) antenna configured for use by the receiver system for radio frequency communications, the RF antenna being configured to receive wirelessly an input signal comprising an input noise and a received signal having a maximum signal strength for a specified frequency below a noise floor, the specified frequency being less than an operating receive frequency band of the receiver system, the receiver system operable to process the received input signal; and
   a calibration system coupled to the receiver system and configured to calibrate the receiver system based upon an analysis of an estimated input noise power of the input signal received via the RF antenna and a measured output noise power at the specified frequency of the receiver system, the output noise power being measured based on an output signal generated at the receiver system from the input signal received via the RF antenna,
   wherein the input noise power comprises a power of the input noise in the input signal,
   wherein the output noise power comprises a power of an output noise in the output signal, and
   wherein the input noise is not internally generated in the mobile device.

10. The mobile device of claim 9, in which the receiver system comprises a low noise amplifier and a filter, the calibration system being configured to calibrate the filter with respect to frequency and the low noise amplifier with respect to relative a gain.

11. The mobile device of claim 9, further comprising an interference detector configured to disable calibration upon detecting an interfering signal.

12. A satellite positioning system receiver, comprising:
   a low noise amplifier configured to process an input signal received wirelessly via a radio frequency (RF) antenna configured for use in radio frequency communications, the input signal comprising an input noise and a received signal having a maximum signal strength below a noise floor; and
   a calibration system coupled to the low noise amplifier and configured to calibrate the low noise amplifier based upon an analysis of a measured output of the satellite positioning system receiver at a specified frequency and an estimated input to the low noise amplifier at the specified frequency, the specified frequency being less than an operating receive frequency band of the satellite positioning system receiver, the measured output being measured based on an output signal generated at the satellite positioning system receiver from the input signal received via the RF antenna,
   wherein the estimated input to the low noise amplifier comprises an estimate of an input noise power, the input noise power comprising a power of the input noise in the input signal,
   wherein the measured output of the satellite positioning system receiver comprises a measure of an output noise power, the output noise power comprising a power of an output noise in the output signal, and wherein the input noise is not internally generated in the satellite positioning system receiver.

13. The satellite positioning system receiver of claim 12, further comprising a filter, the calibration system being configured to calibrate the filter with respect to frequency.

14. The satellite positioning system receiver of claim 12, further comprising temperature circuitry configured to measure an ambient temperature, the calibration system being configured to calibrate an absolute gain based upon the measured ambient temperature.

15. A satellite positioning system receiver, comprising:
means for comparing a measured output of a spread spectrum receiver at a specified frequency and an estimated input to the spread spectrum receiver at the specified frequency; and
means for calibrating the spread spectrum receiver based upon the comparing, the spread spectrum receiver being configured to receive wirelessly an input signal comprising an input noise and a received signal having a maximum strength below a minimum received noise power, the input signal being received via a radio frequency (RF) antenna configured for use in radio frequency communications, the specified frequency being less than an operating receive frequency band of the spread spectrum receiver, the measured output being measured based on an output signal generated at the spread spectrum receiver from the input signal received via the RF antenna,
wherein the estimated input to the spread spectrum receiver comprises an estimate of an input noise power, the input noise power comprising a power of the input noise in the input signal,
wherein the measured output of the spread spectrum receiver comprises a measure of an output noise power, the output noise power comprising a power of an output noise in the output signal, and
wherein the input noise is not internally generated in the satellite positioning system receiver.

16. The satellite positioning system receiver of claim 15, further comprising means for filtering the input signal, the means for filtering being calibrated to improve frequency selectivity.

17. The satellite positioning system receiver of claim 15, wherein the means for calibrating calibrates the spread spectrum receiver upon powering on of the satellite positioning system receiver.

18. A method for calibrating a spread spectrum receiver, the method comprising:
receiving, at the spread spectrum receiver, an input signal comprising an input noise and a received signal, the input signal being received wirelessly via a radio frequency (RF) antenna configured for use in radio frequency communications;
generating, at the spread spectrum receiver, an output signal from the input signal;
estimating an input noise power to the spread spectrum receiver for a specified frequency, the input noise power comprising a power of the input noise in the input signal;
measuring an output noise power for the specified frequency based on the output signal generated at the spread spectrum receiver from the input signal received via the RF antenna, the specified frequency being less than an operating receive frequency band of the spread spectrum receiver, and the output noise power comprising a power of an output noise in the output signal;
comparing the estimated input noise power with the measured output noise power to determine at least one calibration value; and
calibrating the spread spectrum receiver, based upon the at least one calibration value,
wherein the input noise is not internally generated in the spread spectrum receiver, and
wherein the received signal is a signal whose strength is below a noise floor.

19. The method of claim 18, in which the calibrating occurs upon powering up the spread spectrum receiver.

20. The method of claim 18, in which the measuring further comprises integrating the measured output noise power of a time period.

21. The method of claim 18, in which the calibrating includes calibrating a gain of the spread spectrum receiver.

22. The method of claim 18, in which the calibrating calibrates a frequency response of the spread spectrum receiver.

23. A mobile device, comprising:
means for receiving an input signal comprising an input noise and a received signal having a maximum signal strength for a specified frequency below a noise floor, the input signal being received wirelessly via a radio frequency (RF) antenna configured for use in radio frequency communications, the specified frequency being less than an operating receive frequency band of a RF receiver system, the RF receiver system operable to process the received signal; and
means for calibrating the RF receiver system, based upon an analysis of an estimated input noise power and a measured output noise power at the specified frequency of the RF receiver system, the output noise power being measured based on an output signal generated at the RF receiver system from the input signal received via the RF antenna,
wherein the input noise power comprises a power of the input noise in the input signal,
wherein the output noise power comprises a power of an output noise in the output signal, and
wherein the input noise is not internally generated in the mobile device.

24. A satellite positioning system receiver, comprising:
means for amplifying an input signal received wirelessly via a radio frequency (RF) antenna configured for use in radio frequency communications, the input signal comprising an input noise and a received signal having a maximum signal strength below a noise floor; and
means for calibrating the means for amplifying, based upon an analysis of a measured output of the satellite positioning system receiver at a specified frequency and an estimated input to the means for amplifying at the specified frequency, the specified frequency being less than an operating receive frequency band of the satellite positioning system receiver, the measured output being measured based on an output signal generated at the satellite positioning system receiver from the input signal received via the RF antenna,
wherein the estimated input to the means for amplifying comprises an estimate of an input noise power, the input noise power comprising a power of the input noise in the input signal,
wherein the measured output of the satellite positioning receiver comprises a measure of an output noise power, the output noise power comprising a power of an output noise in the output signal, and
wherein the input noise is not internally generated in the satellite positioning system receiver.

25. The method of claim 1, wherein the estimated input noise power comprises an estimation based on a temperature and a radiation resistance of the RF antenna.

26. The non-transitory computer readable medium of claim 4, wherein the estimated input noise power comprises an estimation based on a temperature and a radiation resistance of the RF antenna.

27. The mobile device of claim 9, wherein the estimated input noise power comprises an estimation based on a temperature and a radiation resistance of the RF antenna.

28. The satellite positioning system receiver of claim 12, wherein the estimated input to the low noise amplifier comprises an estimation based on a temperature and a radiation resistance of the RF antenna.

29. The satellite positioning system receiver of claim 15, wherein the estimated input to the spread spectrum receiver comprises an estimation based on a temperature and a radiation resistance of the RF antenna.

30. The method of claim 18, wherein the estimated input noise power comprises an estimation based on a temperature and a radiation resistance of the RF antenna.

31. The mobile device of claim 23, wherein the estimated input noise power comprises an estimation based on a temperature and a radiation resistance of the RF antenna.

32. The satellite positioning system receiver of claim 24, wherein the estimated input to the means for amplifying comprises an estimation based on a temperature and a radiation resistance of the RF antenna.

33. The method of claim 1, further comprising calibrating a frequency of the receiver, based upon the determined gain in the specified frequency band.

34. The method of claim 1, further comprising:
determining a peak noise frequency which is a frequency corresponding to a peak of the measured output noise power; and
calibrating a frequency response of the receiver based on the peak noise frequency.

35. The non-transitory computer readable medium of claim 4, further comprising:
program code that causes the processor to determine a peak noise frequency which is a frequency corresponding to a peak of the measured output noise power; and
program code that causes the processor to calibrate a frequency response of the RF receiver based on the peak noise frequency.

36. The mobile device of claim 9, wherein the calibration system is further configured to determine a peak noise frequency which is a frequency corresponding to a peak of the measured output noise power, and to calibrate a frequency response of the receiver system based on the peak noise frequency.

37. The satellite positioning system receiver of claim 12, wherein the calibration system is further configured to determine a peak noise frequency which is a frequency corresponding to a peak of the measured output noise power, and to calibrate a frequency response of the low noise amplifier based on the peak noise frequency.

38. The satellite positioning system receiver of claim 15, further comprising:
means for determining a peak noise frequency which is a frequency corresponding to a peak of the measured output noise power,
wherein the means for calibrating calibrates a frequency response of the spread spectrum receiver based on the peak noise frequency.

39. The method of claim 18, further comprising:
determining a peak noise frequency which is a frequency corresponding to a peak of the measured output noise power,
wherein the calibrating includes calibrating a frequency response of the spread spectrum receiver based on the peak noise frequency.

40. The mobile device of claim 23, further comprising:
means for determining a peak noise frequency which is a frequency corresponding to a peak of the measured output noise power,
wherein the means for calibrating calibrates a frequency response of the RF receiver based on the peak noise frequency.

41. The satellite positioning system receiver of claim 24, further comprising:
means for determining a peak noise frequency which is a frequency corresponding to a peak of the measured output noise power,
wherein the means for calibrating calibrates a frequency response of the means for amplifying based on the peak noise frequency.

* * * * *